UNITED STATES PATENT OFFICE.

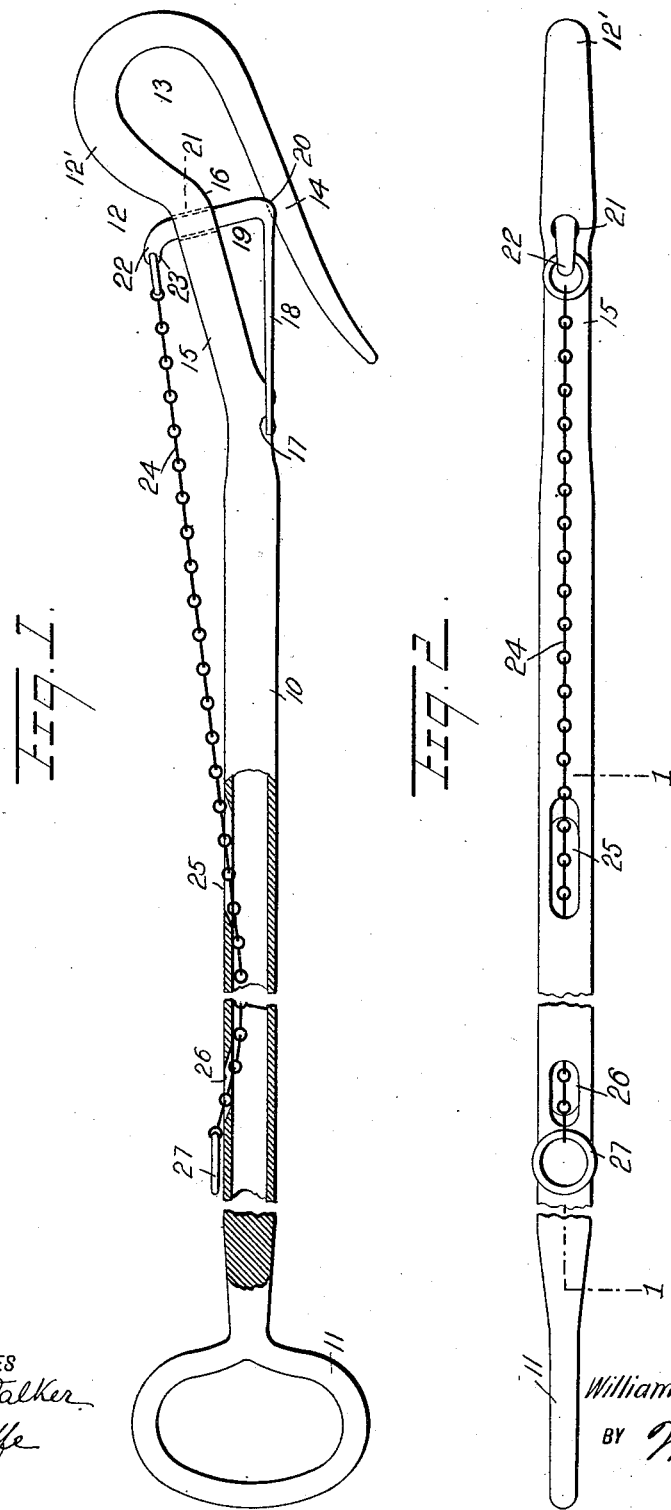

WILLIAM TRUMAN SHERMAN, OF PERU, NEW YORK.

BULL-STAFF.

1,098,181. Specification of Letters Patent. Patented May 26, 1914.

Application filed October 3, 1912. Serial No. 723,765.

*To all whom it may concern:*

Be it known that I, WILLIAM T. SHERMAN, a citizen of the United States, and a resident of Peru, in the county of Clinton and State of New York, have invented a new and Improved Bull-Staff, of which the following is a full, clear, and exact description.

This invention is an improvement in bull staffs, and has for its object to provide an inexpensive and reliable device with which the bull may be easily and safely conducted. To carry out the above-stated object, I provide a longitudinal member having a hook and handle at its opposite extremities, a flexible member associated with the hook so as to normally close the hook gap, and means associated with said flexible member for the manual operation of the same.

Reference is to be had to the accompanying drawings forming a part of this specification, in which similar characters of reference indicate corresponding parts in both views.

Figure 1 is a side elevation, partially in section, of an embodiment of my invention; and Fig. 2 is a plan view of the same.

Referring to the drawings, 10 is a longitudinal member, preferably tubular and provided at its extremities with a handle 11 in the form of an eye, and a hook 12, both rigidly associated with said longitudinal member, and preferably welded to same and lying in the same plane. The hook 12 has a circular portion 12', forming a loop 13 and ending smoothly in a tongue 14. The portion 15 connecting the circular member of the hook with the longitudinal member, forms, with the circular portion, a boss 16, projecting toward the tongue member 14 so as to contract the hook gap between the portion 15 and tongue 14 near the loop 13. The portion 15 of the hook 12 near the longitudinal member, is so bent that the offset 17 provided near the bend, directs the spring portion 18 of the resilient member 19, rigidly attached to said offset in any suitable way, in a direction parallel to the longitudinal axis of the device. The flexible member 19 at the point of contact 20 with the tongue of the hook, is bent so as to be normal to the portion 15, and projects through an orifice 21 provided in the said portion 15 near the boss 16. The projecting end 22 of the spring member 19 is provided with an orifice 23 to which a chain 24 is attached. The chain 24, from the end 22, leads to an orifice 25 provided in the tubular member 10 in the proximity of the hook, then through the tubular member, and out of the same through another orifice 26 formed in the said tubular member near the handle 11, the two orifices 25 and 26 being in the same plane and on the same side of the tubular member. A ring 27 is provided for the end of the chain projecting through the orifice 26 so as to prevent the said end from dropping into the tubular space of the tubular member, and also, by means of said ring 27 the flexible member is manipulated. The bend 20 of the flexible member 19 at the point of contact with the tongue 14, is made concave so as to prevent lateral movement of the bend on the tongue.

The length of my device is such that while it can be easily handled, it keeps the operator at a safe distance from the bull. The extremity of the tongue 14 of the hook 12 is engaged with the nose ring of the bull, and by a simple pull on the handle 11 the nose ring is forced beyond the bend 20 of the flexible member 19. It is self-evident that the nose ring will force the flexible member 19 through the orifice 21 of the portion 15 of the hook and enter into the loop 13 of the hook, while the flexible member 19 will replace itself automatically, due to its spring action. When it is desired to release the nose ring, a pull applied to the ring 27 will be transmitted through the chain to the end 22 of the flexible member 19, and force the contacting corner 20 away from the tongue 14 so that the hook may be slipped off the nose ring. By releasing the ring 27, the flexible member 19 will restore to its original position. The flexible member 19 at the point of contact 20 with the tongue is provided with a recess shown in dotted lines in Fig. 1, so that the position of the flexible member is more stable and prevents side displacement of the same.

Having thus described my invention, I claim as new and desire to secure by Letters Patent—

A bull staff comprising a tubular member having a handle at one end and a hook at its opposite end, said hook having its curved portion offset from the longitudinal axis of said tubular member, and the end portion of the hook's tongue being offset in the opposite direction of the same axis, said hook having a rounded boss formed therein opposite the tongue and an aperture near said boss in the plane of the hook; a resilient member lying in the gap of the hook formed of a spring portion rigidly attached to said member at one end, the other inflexible portion of said resilient member being integral with said spring portion and forming an acute angle with same, said inflexible portion projecting through said aperture, the apex of said resilient member having a recess normally bearing on the tongue; and means associated with the projecting end of said inflexible portion of the resilient member whereby the said resilient member can be operated from the handle of said tubular member.

In testimony whereof, I have signed my name to this specification in the presence of two subscribing witnesses.

WILLIAM TRUMAN SHERMAN.

Witnesses:
B. E. HOLDEN,
F. J. BOSWORTH.

Copies of this patent may be obtained for five cents each, by addressing the "Commissioner of Patents, Washington, D. C."